UNITED STATES PATENT OFFICE.

EDWARD D. KENDALL, OF BROOKLYN, NEW YORK.

COMPOSITION OF MATTER FOR THE EXTRACTION OF PRECIOUS METAL FROM ORE.

SPECIFICATION forming part of Letters Patent No. 500,137, dated June 27, 1893.

Application filed April 21, 1893. Serial No. 471,270. (No specimens.)

*To all whom it may concern:*

Be it known that I, EDWARD D. KENDALL, a citizen of the United States, residing at Brooklyn, in the county of Kings and State of New York, have invented a new and useful Composition of Matter for Extracting Precious Metal or Metals from Ores, so-called Tailings, and other Matters, of which composition the following is a specification.

My composition consists of the following bodies, combined or brought together as hereinafter stated, viz: water, a suitable hyposulphite or hyposulphites and a suitable ferricyanide or ferricyanides. The simplest way to prepare my said composition is to add to an aqueous solution of a hyposulphite, for example, hyposulphite of soda, an aqueous solution of a ferricyanide, for example fericyanide of potassium. The relative quantity of water used in preparing my said composition may vary with circumstances; the composition may be much diluted with water or comparatively concentrated, according to the natures of the ores and the requirements of operators.

The aforesaid ores, tailings and other matters are to be treated by lixiviation, with or without the application of heat. My said composition may be produced by mixing one or two of its constituents with the ore and adding the other or others afterward; a hyposulphite in solid form may be mechanically mixed with the ore during or after pulverization and a solution of ferricyanide may be added afterward, or ferricyanide may be incorporated with the ore and solution of hyposulphite afterward added.

I do not confine myself to any particular proportions of the constituents of my said composition, chiefly because it is sometimes desirable to treat successively several portions of ore with one portion of liquid and in such cases I use a comparatively strong solution of hyposulphite, add thereto a small proportion of ferricyanide, subject a portion of the ore to the action of the composition, draw off the solution containing precious metal, reinforce the solution with another small proportion of ferricyanide, treat a second portion of the ore with this solution and so repeatedly, the number of such successive treatments of different portions of the ore depending on the nature and grade of the ore.

In treating ores with my composition ordinary leaching tubs may be used or rotating cylinders may be used to effect thorough mixing of my composition with the ore. After lixiviation the precious metal extracted from the ores, tailings or other matters, may be obtained from the solution by electrolysis or any other suitable means.

What I claim, and desire to secure by Letters Patent of the United States, is—

The herein described composition of matter, to be used for extracting precious metal from ores, tailings and other matters, consisting of a suitable hyposulphite or hyposulphites and a suitable ferricyanide or ferricyanides, and water, substantially as described.

EDWARD D. KENDALL.

Witnesses:
M. E. HILL,
A. W. BAYLIS.